UNITED STATES PATENT OFFICE.

WILLARD S. BOON, OF ST. LOUIS, MISSOURI.

PRESERVED GRITS.

SPECIFICATION forming part of Letters Patent No. 242,588, dated June 7, 1881.

Application filed March 26, 1881. (No specimens.)

*To all whom it may concern:*

Be it known that I, WILLARD S. BOON, of the city of St. Louis, in the State of Missouri, have invented a certain new and useful Improvement in the Manufacture of Samp-Grits, of which the following specification is a full, clear, and exact description.

My improvement relates to a new article of merchandise consisting of samp-grits treated with an alkali, to render it at once less liable to injury from dampness and heat, and more palatable and wholesome; also more easy to cook. This may be prepared in either of two ways.

First, the samp-grits, as it comes from the grinding-mill, may be treated, when in its dry state, with a weak solution of lye made from hickory-ashes or some other ashes, or other alkaline solution, made in about the proportions of twenty parts water to one part of lye strong enough to float an egg. The treatment may be by sprinkling the solution on the meal, or by immersion of the same in the alkaline solution. In either case, when the grits has imbibed sufficient of the alkali it is rendered dry by any suitable means. I prefer to kiln-dry it. It may then be barreled up or put in other packages. It will not be subject to deterioration by time nor injury from attacks of insects.

Second, the corn may be cracked to the size of hominy, the hulls then blown away; and the hominy treated as above, and after being perfectly dried it may be reduced by regrinding to the size of samp-grits.

The alkaline solution may be used at any temperature that will not change the natural condition of the meal, for if this is cooked in any degree its character is changed and it is liable to spoil.

In my treatment of the cracked or ground corn I usually take cold or cool lye made from hickory-ashes and filtered. The alkali is supplied in just sufficient quantity to impart the desired flavor and preservative qualities, and would never be in quantity sufficient to impair the digestive organs of the consumer.

I intend to file another application to cover corn-meal manufactured under the above-described processes.

I am aware that it is not new to add carbonate of soda to vegetables at the time of cooking the same by boiling, and this, therefore, I do not claim.

Having thus described my invention, the following is what I claim as new therein and desire to secure by Letters Patent:

As a new edible article of commerce, grits alkalized and dry.

WILLARD S. BOON.

Witnesses:
SAML. KNIGHT,
GEO. H. KNIGHT.